United States Patent
Jung

(10) Patent No.: US 12,259,483 B2
(45) Date of Patent: Mar. 25, 2025

(54) METHOD FOR PROVIDING TIME INFORMATION IN A GNSS RECEIVER

(71) Applicant: Robert Bosch GmbH, Stuttgart (DE)

(72) Inventor: Stefan Jung, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 17/813,538

(22) Filed: Jul. 19, 2022

(65) Prior Publication Data

US 2023/0027979 A1 Jan. 26, 2023

(30) Foreign Application Priority Data

Jul. 21, 2021 (DE) ..................... 10 2021 207 770.6

(51) Int. Cl.
*G01S 19/33* (2010.01)
(52) U.S. Cl.
CPC .................................. *G01S 19/33* (2013.01)
(58) Field of Classification Search
CPC .......... G01S 19/33; G01S 19/39; G01S 19/23; G01S 19/05; G01S 19/27; G04R 20/04; G04R 20/06
See application file for complete search history.

(56) References Cited

U.S. PATENT DOCUMENTS

| 5,923,618 A | * | 7/1999 | Nelson, Jr. | G01S 19/23 368/155 |
| 2003/0207681 A1 | * | 11/2003 | Rowitch | G01S 19/07 370/335 |
| 2016/0025859 A1 | * | 1/2016 | Basnayake | G04R 20/06 342/357.62 |
| 2021/0190963 A1 | * | 6/2021 | Hua | G01S 19/08 |
| 2021/0293974 A1 | * | 9/2021 | Peterson | G01S 19/33 |

FOREIGN PATENT DOCUMENTS

EP 1515156 A1 * 3/2005 ............. G01S 19/27

* cited by examiner

*Primary Examiner* — Timothy A Brainard
*Assistant Examiner* — Kenneth W Good
(74) *Attorney, Agent, or Firm* — Maginot, Moore & Beck LLP

(57) ABSTRACT

A method for providing time information in a GNSS receiver includes receiving at least one time counter variable from a GNSS satellite. The at least one time counter variable describes a number of time intervals that have passed since a time start value, and a data length of the time counter variable limited to a maximum number of countable time intervals. The method also includes reading an offset variable out of a non-volatile memory held in the GNSS receiver. The offset variable describes a time previously received and reconstructed by the GNSS satellite, and a data length of the offset variable exceeds the data length of the time counter variable. The method further includes carrying out a remainder division of the offset variable with a maximum number given by the data length of the at least one time counter variable in order to determine an offset time counter variable.

11 Claims, 1 Drawing Sheet

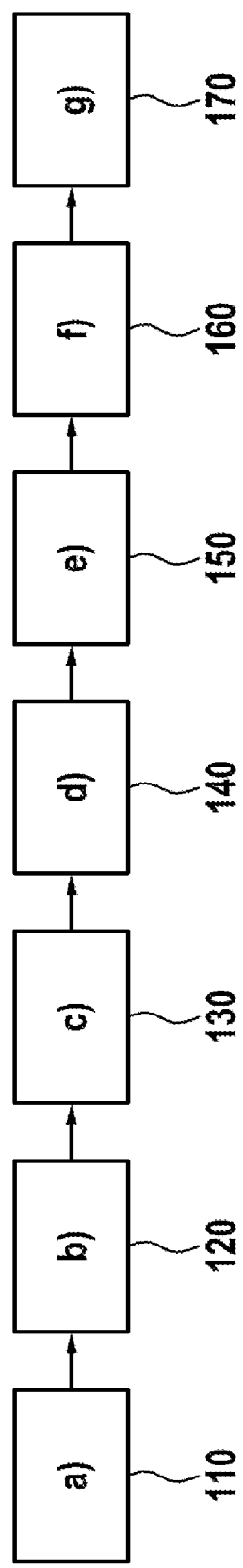

METHOD FOR PROVIDING TIME INFORMATION IN A GNSS RECEIVER

This application claims priority under 35 U.S.C. § 119 to patent application no. DE 10 2021 207 770.6, filed on Jul. 21, 2021 in Germany, the disclosure of which is incorporated herein by reference in its entirety.

The disclosure relates to a method for providing time information in a GNSS receiver.

BACKGROUND

A global navigation satellite system (GNSS) is a system for positioning and navigation on Earth and in the air by receiving navigation satellite signals. Each navigation satellite signal contains the information about the current position of the corresponding navigation satellite and the current time. By receiving at least four navigation satellite signals from four different navigation satellites of the same GNSS, it is possible to determine the position of an object equipped with the GNSS receiver.

However, when decoding the time information contained in the navigation satellite signal, the so-called week number roll-over problem can occur, which can lead to incorrectly decoded time information and thus to an incorrect position determination.

In GPS, for example, the so-called LNAV navigation message is decoded. It represents the time in the format Week Number (WN) and Time Of Week (TOW). While the TOW counts the number of seconds that have passed since the beginning of a week and is reset to 0 every new week, the WN continuously counts the weeks that have passed since Jan. 6, 1980. Accordingly, on the date of May 27, 2021, the GPS WN was 2159, for example. However, only 10 bits are provided in the GPS-LNAV message for the WN, which means that the WN as transmitted by the satellite can take a maximum value of 1023. The following week will be transmitted as 0 again. A navigation receiver that determines its date only on the basis of the GPS-LNAV message therefore risks undergoing a date jump by 1023 weeks into the past after at most 1023 weeks (corresponding to about 19.7 years). Such so-called GPS week number roll-overs have already occurred in 1999 and 2019 and led to a number of problems, some of which were also described in the press.

The European satellite navigation system Galileo uses the same representation of the date in WN and TOW, however, the Galileo navigation message provides 12 bits for the WN, so that with the WN count starting from April 1999, the first roll-over will take place in 2078, which is beyond the lifetime of current products. Glonass transmits the date in another format and is theoretically immune to such a problem until sometime after 2120.

The modern GPS signals with their corresponding messages provide more bits for the WN, so that the roll-over problem here is also sufficiently shifted into the future, but the LNAV signal and its message are currently by far the most commonly used signal for civil purposes.

In order still to determine a correct date from the GPS-LNAV message, GNSS receivers currently use a static offset value set in firmware that allows the correct WN to be reconstructed. However, such GNSS receivers run the risk of determining an incorrect date again 1023 weeks after the offset.

SUMMARY

Described here is a new means of mitigating or eliminating the week number roll-over problem by using an offset variable that can be dynamically varied over time instead of the static offset value specified in the firmware. This means that 1023 weeks can be shifted back in time with the modifiable offset variable. This will mitigate or eliminate the roll-over problem.

Based on this, a method for providing time information in a GNSS receiver is described here, having the following steps: a) receiving at least one time counter variable from a GNSS satellite, wherein the time counter variable describes a number of time intervals that have passed since a time start value, a data length of the time counter variable being limited to a maximum number of countable time intervals, b) reading an offset variable out of a non-volatile memory held in the GNSS receiver, wherein the offset variable describes a time previously received and reconstructed by the GNSS satellite and its data length exceeds the data length of the time counter variable, c) carrying out a remainder division of the offset variable with the maximum number given by the data length of the time counter variable from step a) in order to determine an offset time counter variable, d) forming a difference between the time counter variable and the offset time counter variable formed in step c), e) if the difference is negative, increasing the difference by the maximum number of countable time intervals to produce a corrected difference, f) adding the difference formed in step d) to the offset variable in order to determine a time information.

The method preferably includes also carrying out the following step after step f): g) if the difference exceeds a threshold value, writing the time information to the non-volatile memory.

The described method is used particularly advantageously in a GNSS-based localization system for autonomous driving. Autonomous driving here means in particular the locomotion of vehicles, mobile robots, and driverless transport systems (e.g. motor vehicles, aircraft, ships), which behave largely autonomously by means of a GNSS receiver of the localization system and based on Global Navigation Satellite Systems (GNSS). It is particularly advantageous if an autonomously driven motor vehicle is equipped with a localization system having such a GNSS receiver to carry out the described method.

The following Global Navigation Satellite Systems (GNSS) are currently known to exist: NAVSTAR GPS (Global Positioning System) of the United States of America, GLONASS (Global Satellite Navigation System) of the Russian Federation, Galileo of the European Union, and Beidou of the People's Republic of China.

However, each GNSS exhibits the so-called roll-over problem, which results from the fact that the available data length for time information transmitted by the satellite system is limited. For example, in systems where the time information is provided as week numbers, this problem is a week number roll-over problem. The only difference is that in some GNSS (e.g. GPS), due to their relatively few available bits (10 bits for GPS) for representing week numbers, this problem occurs more frequently (approx. every 19.7 years for GPS) than in another GNSS (e.g. 12 bits, every approximately 78 years for Galileo). The method described is suitable in principle for providing time information for all GNSS systems. To provide a better understanding, the method is described in the following using the example of GPS.

The signals emitted by GNSS satellites are referred to as GNSS signals. Accordingly, the signals are referred to as GPS signals when the signals are sent from GPS satellites. In a GPS signal—specifically in a GPS LNAV navigation message—the atomic clock time information is represented in the format Week Number (abbr. to WN) and Time of Week (abbr. to TOW). After receiving the GPS signal, the atomic clock time information contained in the GPS signal is decoded and the week number is reconstructed from the decoded atomic clock time information. The time information is provided based on the reconstructed week number.

The time information here refers in particular to the time information reconstructed according to the atomic clock time information contained in the GPS signal, which can be used, for example, to calculate the distance between the GPS satellite and the GNSS receiver and thus to determine position and/or to synchronize with the quartz clock of the GNSS receiver. The time information can be additionally represented by e.g. coordinated world time (abbr.: UTC) instead of binary codes.

The GNSS receiver is configured to receive GNSS signals. The modern GNSS receiver can receive and evaluate GNSS signals from different GNSS. This means, for example, that the GNSS receiver can receive and evaluate both GPS signals and Galileo signals.

To provide the time information, in step a) at least one time counter variable is received from a GNSS satellite by the antenna of the GNSS receiver, wherein the time counter variable describes a number of time intervals that have passed since a time start value, a data length of the time counter variable being limited to a maximum number of countable time intervals.

Here, the at least one time counter variable refers in particular to the GPS week number (abbr.: GPS-WN) contained in the GPS signal, which describes the number of weeks that have passed since a time start value (e.g. initial time value of the third GPS epoch) until the time at which the GPS signal is transmitted. The time interval here therefore means one week (7 days=604,800 seconds) and the number of time intervals here accordingly means the number of weeks, which can be represented by the week number. Of course, time of week is also included in the GPS signal as an additional time counter variable. However, it plays a minor role in the method under discussion here.

Because the GPS week number in the GPS-LNAV message is represented by 10 bits, the GPS week number can be counted consecutively from 0 to a maximum of 1023. The consecutive count from 0 to 1023 weeks in the GPS signal began on 6 Jan. 1980 and ended on 21 Aug. 1999. From 21 Aug. 1999 the consecutive count is repeated and runs from 0 to 1023 weeks, so that the repeated count was completed on 6 Apr. 2019. The counting continues to be carried out repeatedly in this way.

The period between 6 Jan. 1980 and 21 Aug. 1999 is designated as the first GPS epoch (E1), and the period between 21 Aug. 1999 and 6 Apr. 2019 as the second GPS epoch (E2). We are currently in the third GPS epoch (E3), which began on 6 Apr. 2019 and will end on 20 Nov. 2038.

The official GPS week number is not limited to 10 bits and is therefore not subject to the repeated counting, but counts consecutively the number of weeks passed since 6 Jan. 1980.

A time information is also available in a GNSS receiver, for example in a non-volatile memory, where a time information can be stored as an offset variable. The time information in the offset variable is regularly updated with the time information received from the satellite via the time counter variable. This occurs according to the method described here. For this purpose, the offset variable is read out of the non-volatile memory in step b) and, under certain conditions which are explained in more detail below, also written back to or updated in the non-volatile memory in step g).

In step c), an offset time counter variable is then calculated by carrying out a remainder division of the offset variable with the maximum number. The purpose of this calculation is to obtain an offset variable shortened to the data length of the time counter variable received from the satellite.

Until now, a static offset value has normally been defined in a firmware and stored in a read-only memory (e.g. ROM) so that the offset value as a static value can no longer change and the occurrence of the week number roll-over problem cannot be postponed.

On the other hand, the offset variable can change its value dynamically with the described method and, in addition, preferably even corresponds to the time information provided. This applies at least to times at which the offset variable is updated in accordance with step g). It is preferable if the offset variable is stored in a non-volatile memory and can change its value in such a way that a subsequent value replaces the preceding value in the non-volatile memory and is stored. In this case, the non-volatile memory refers in particular to the storage medium in which the stored offset variable can be retained permanently—even while the GNSS receiver is not in operation or is not supplied with power—and in addition in which its previous value can be (electrically) deleted and its new, subsequent value stored.

In step d), a difference between the time counter variable received in step a) and the offset time counter variable calculated in step c) is calculated. This difference represents the time interval between the time counter variable and the offset time counter variable. For example, it is possible to tell from the difference how long ago the offset variable was last updated.

In addition, a check is carried out in step e) to determine whether the difference is negative. This case occurs if a roll-over has occurred since the time the offset variable was last updated and the time when the time counter variable was received from the GNSS satellite. For example, if the maximum number of time intervals that can be counted is "1024", if the offset variable in the time counter variable of the satellite is currently at "1022" but, for example, a "5" has been received, then the difference is, for example, "−1017". By adding the (negative) difference to the maximum number, the value 5 would then be obtained. By adding the maximum number in the event of a negative difference, displacements caused by the overflow can be compensated.

The time information is then determined in step f). To do this, the corrected difference is added to the offset variable. This time information can then be used for processing steps subsequent to the method in the GNSS receiver.

In step g), the time information is then preferably written into the non-volatile memory as a new/updated offset variable. The old offset variable read out in step b) is preferably overwritten in the process.

The method described reduces the problem of an incorrect date being reconstructed from the GPS-LNAV message and there being no other means to receive the current date. If the GNSS receiver is used regularly, i.e. at least once within a period of 1024 weeks, in such a way that it can determine the WN from the GPS-LNAV navigation message, the problem is even completely eliminated.

It is preferred if the countable time intervals are weeks.

It is also preferred if the maximum number of time intervals equals 1024.

In a preferred design variant, the threshold used in step g) is greater than 10.

A threshold value of less than 100 is particularly preferred.

The purpose of using the threshold value in step g) is to control the timing of the update of the offset variable. On the one hand, the offset variable should be up-to-date to a certain degree. At the same time, the storage should not occur too often.

It is particularly preferred if the threshold is implemented as week number 52.

Such a threshold means that the offset variable is usually updated once a year (every 52 weeks), assuming that the described method is carried out regularly. The method is usually carried out whenever the GNSS receiver receives data. In some cases, the GNSS receiver may not operate at all for quite long periods of time. The GNSS receiver will then not receive any data and major violations of the threshold may occur. For example, if the GNSS receiver was not in use for two years, the difference would increase to 104.

For the described method to work, the threshold must not exceed the maximum number of time intervals.

With GPS, the difference between the time counter variable and the offset time counter variable can only be 0 to 1023. The difference of 0 describes the situation in which the offset variable stored and read out in step b) corresponds to the current offset variable. The difference is always higher the longer the offset variable has not been updated. If the difference exceeds the week number 1023, the week roll-over problem could occur, so the time information can no longer be calculated correctly in step f).

For this reason, the offset variable is regularly updated in step g).

It is particularly advantageous in this process if the difference does not exceed a value that is far less than 1024. In this way, an early update of the offset variable stored in the non-volatile memory is taken into account. For example, a threshold of 52 would correspond to the period of 52 weeks, i.e. approximately one year. This would mean the offset variable is updated approximately annually, limiting the number of write operations to the non-volatile memory, which usually has a finite number of write operations. The maximum permissible difference value can be predefined as a threshold value and in principle can be changed to another value depending on the application requirements. If the difference reaches or exceeds the threshold, the offset variable stored in the non-volatile memory will change in such a way that the start time described by the offset variable is replaced by a later start time. Thus, the difference is shortened and the associated week roll-over problem is postponed.

It is preferable if the time information is synchronized with an independent timer.

It is also preferred if GNSS satellites from a GNSS other than the independent timer are implemented.

In this case, the update of the offset variable according to step g) can be linked to further conditions, for example to the confirmation of the offset WN to be written by decoding of the WN of other GNSS systems and conversion to the corresponding GPS-WN, or to another method of determining the current time followed by conversion into the GPS WN/TOW system. For example, the confirmation of the WN could be requested by independent decoding of the WN from the messages of at least three Galileo satellites before the offset variable is updated.

The update of the offset variable (step g)) can be written either immediately or as part of routines that are triggered before the GNSS receiver is switched off. However, it should be used immediately to correctly reconstruct the date even if a roll-over occurs during the operating time of the GNSS receiver.

It is preferred if a control unit for the GNSS receiver is configured to carry out the described method.

It is particularly preferred if a computer program is used to carry out a method described here. In other words, this relates in particular to a computer program (product), comprising commands which during the execution of the program by a computer, cause it to execute a method described here.

It is also preferred if a machine-readable storage medium is applied, on which the computer program proposed here is stored. Typically, the machine-readable storage medium is a computer-readable data carrier.

As described above, the core of the described method is not to implement the offset statically, but to adapt the software so that it updates the offset regularly, e.g. annually, with the currently reconstructed week number. This updated offset will be used the next time the GNSS receiver is switched on to reconstruct the WN from the GPS-LNAV navigation message. In this way, the WN roll-over is constantly shifted into the future by up to 1023 weeks and does not pose a problem for the reconstruction of the correct date.

A secured variant can be implemented by synchronizing the updated offset with the WN determined by other GNSS systems, e.g. Galileo, or with other reliable external timers, the time information of which can be converted into the GPS WN/GPS TOW format. This prevents a GNSS receiver that remains without GNSS reception for more than 1023 weeks in a row from missing a roll-over and thus running the risk of incorrectly reconstructing the date forever after. In this case, the need for other constellations or external timers for correct date determination is only sporadically necessary, namely whenever the offset needs to be updated. The correct date can be determined even if only GPS satellites are available.

BRIEF DESCRIPTION OF THE DRAWING

The method presented here as well as its technical background will be explained in more detail below on the basis of the FIGURE. It should be noted that the method is not limited by the exemplary embodiments shown.

The FIGURE shows a schematic representation of a sequence of the method presented here for checking a localization system in a regular operating process.

DETAILED DESCRIPTION

In the FIGURE, the illustrated sequence of method steps a), b), c), d), e), f) and g) with the blocks 110, 120, 130, 140, 150, 160 and 170 is only provided as an example. In block 110 (step a)) at least one time counter variable is received from a GNSS satellite, wherein the time counter variable describes a number of time intervals that have passed since a time start value, wherein a data length of the time counter variable is limited to a maximum number of countable time intervals. In block 120 (step b)), an offset variable is read out of a non-volatile memory stored in the GNSS receiver, the offset variable describing a start time. In block 130 (step c)), the remainder division is carried out in order to determine the assigned offset time counter variable from the offset variable. In block 140 (step d)), a difference is formed between the time counter variable and the offset time counter variable. In block 150 (step e)), the difference is corrected if it is negative. In block 160 (step f)) the time information for subsequent calculations is calculated and provided. In block 170 the offset variable stored in the non-volatile memory is updated (step g)) if a threshold value has been exceeded.

In addition, the time information provided can be synchronized to an independent timer, such as GNSS signals from another GNSS or another type of external timer, before the update.

What is claimed is:

1. A method for providing current time information in a global navigation satellite system (GNSS) receiver, comprising:
   receiving at least one time counter variable from a GNSS satellite with the GNSS receiver, wherein the at least one time counter variable describes a number of time intervals that have passed since a time start value, a data length of the at least one time counter variable limited to a maximum number of countable time intervals;
   reading past time information out of a non-volatile memory held in the GNSS receiver, wherein the past time information describes a time previously received and reconstructed by the GNSS satellite and a data length of the past time information exceeds the data length of the at least one time counter variable;
   carrying out a remainder division of the past time information with a maximum number given by the data length of the at least one time counter variable in order to determine an offset time counter variable;
   determining a difference between the at least one time counter variable and the offset time counter variable;
   when the determined difference is negative, increasing the determined difference by the maximum number of countable time intervals to produce a corrected difference; and
   reconstructing the current time information by adding the determined difference to the past time information offset variable.

2. The method according to claim 1, further comprising:
   when the determined difference exceeds a threshold value, writing the current time information to the non-volatile memory.

3. The method according to claim 1, wherein the countable time intervals are weeks.

4. The method according to claim 1, wherein the maximum number of countable time intervals is 1024.

5. The method according to claim 2, wherein the threshold value is greater than 10.

6. The method according to claim 5, wherein the threshold value is less than 100.

7. The method according to claim 1, wherein the time information is synchronized with an independent timer.

8. The method according to claim 7, wherein GNSS satellites from a different GNSS than the independent timer are implemented.

9. The method according to claim 1, wherein a control unit for the GNSS receiver is configured for carrying out the method.

10. The method according to claim 1, wherein a computer program is configured to carry out the method.

11. The method according to claim 10, wherein the computer program is stored on a non-transitory machine-readable storage medium.

* * * * *